UNITED STATES PATENT OFFICE.

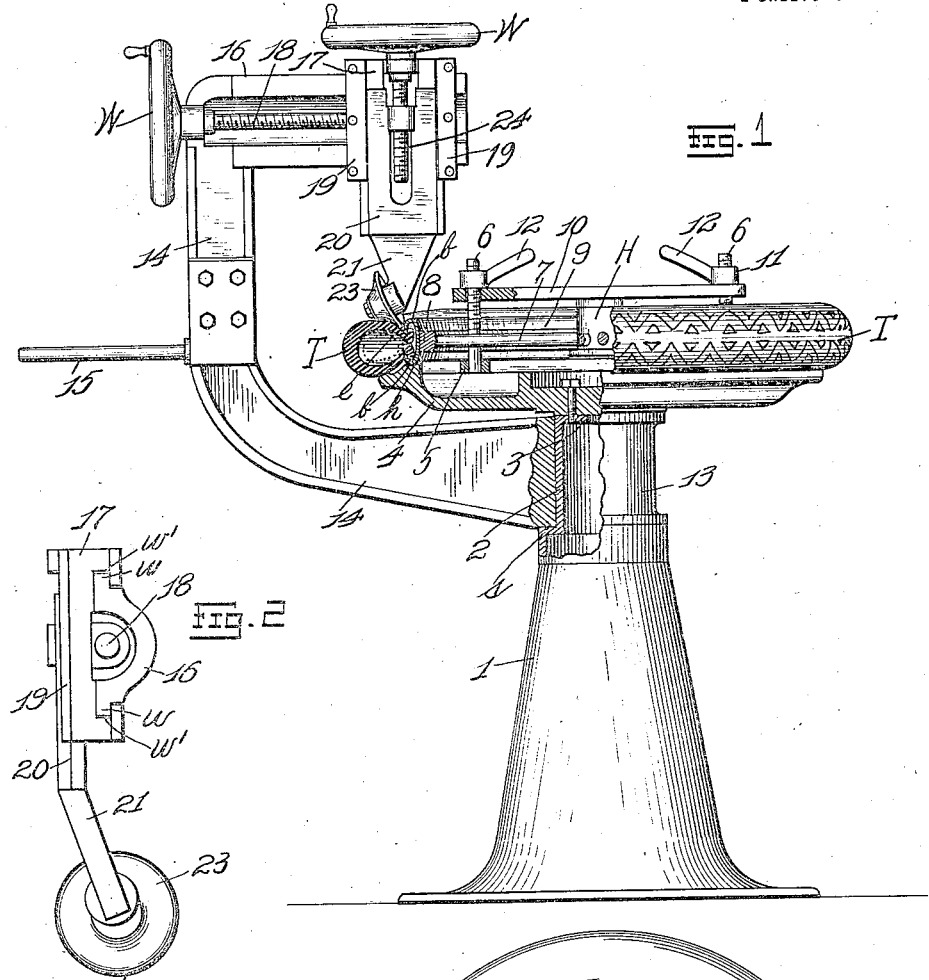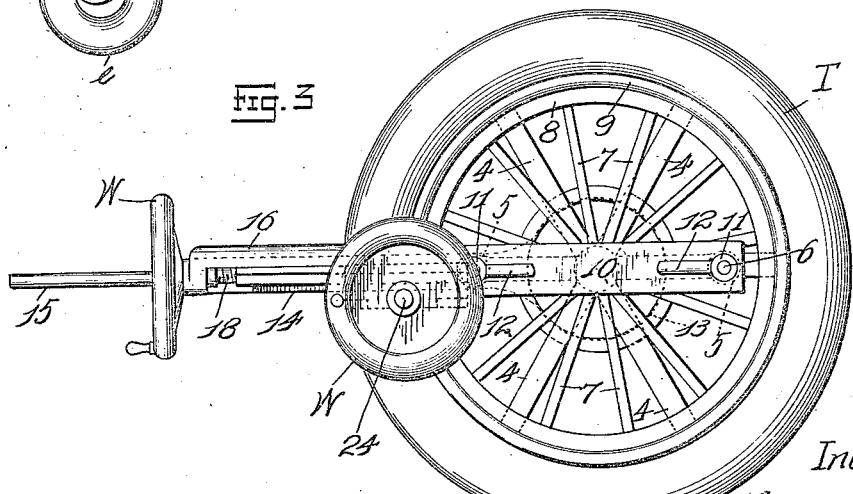

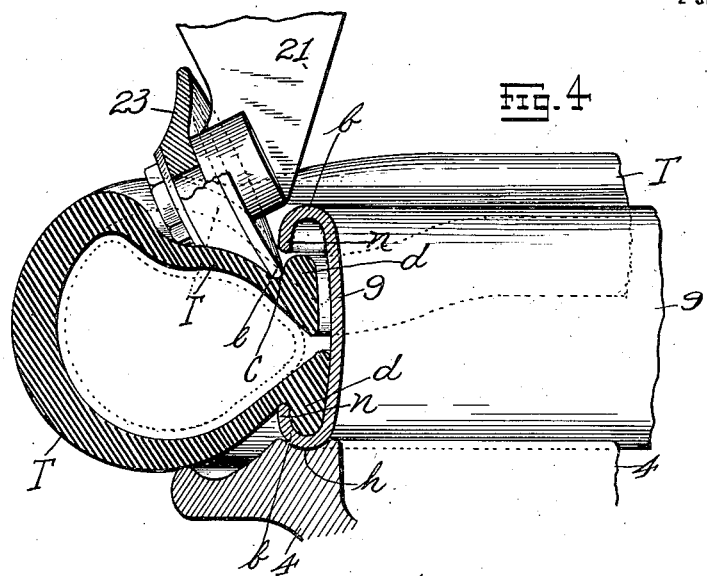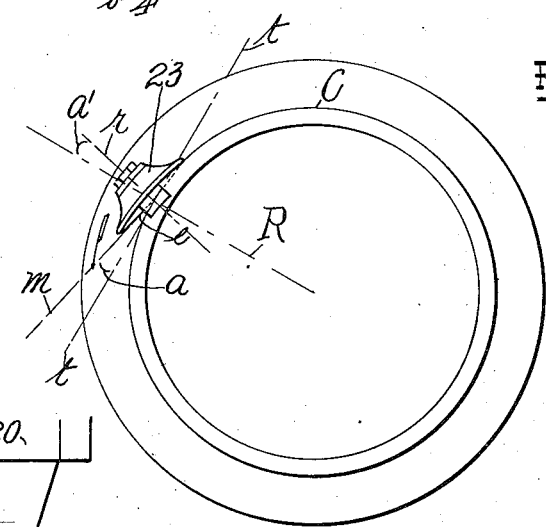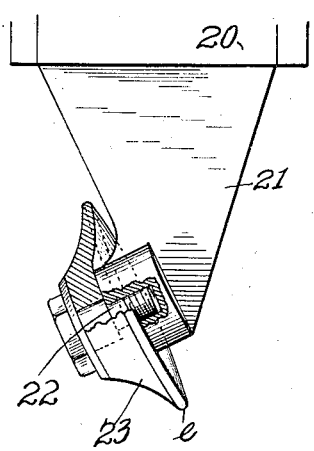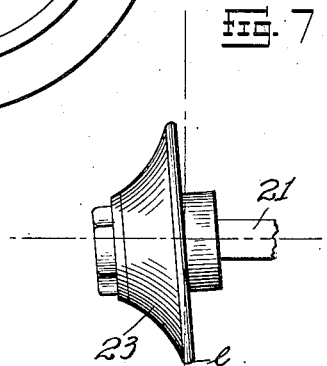

THOMAS KRAUSKA, OF ST. LOUIS, MISSOURI, ASSIGNOR TO ALASTIC TIRE CUSHION COMPANY, OF ST. LOUIS, MISSOURI, A CORPORATION OF MISSOURI.

TIRE-SETTING MACHINE.

1,416,094.   Specification of Letters Patent.   Patented May 16, 1922.

Application filed April 5, 1920. Serial No. 371,308.

*To all whom it may concern:*

Be it known that I, THOMAS KRAUSKA, a citizen of the United States, residing at St. Louis, State of Missouri, have invented certain new and useful Improvements in Tire-Setting Machines, of which the following is a full, clear, and exact description, reference being had to the accompanying drawings, forming a part hereof.

The present invention is directed to improvements in tire setting machines, that is, machines for attaching resilient tires, whether solid or pneumatic, to the rims of vehicle wheels. The objects sought are to provide a machine by which a tire may be attached or set, in a minimum amount of time, one which is simple in construction, reliable, one likewise capable of releasing the tire from the rim when the occasion arises to remove the tire, and one possessing further and other advantages better apparent from the following detailed description in connection with the accompanying drawings in which—

Figure 1 represents an elevation of the machine showing a pneumatic tire being attached to the rim of the wheel, parts being in section; Fig. 2 is an end view of the feed mechanism for the tire-setting roller; Fig. 3 is a top plan of the machine; Fig. 4 is an enlarged cross-section of the tire and a side view of the setting roller in operative position; Fig. 5 is a diagrammatic plan showing the relation of the plane of rotation of the roller to the tangent to the arc of its sweep about the periphery of the wheel rim; Fig. 6 is an enlarged side view of the arm carrying the tire-setting roller, with roller partly in section; and Fig. 7 is an edge view of the parts shown in Fig. 6.

Referring to the drawings, 1 represents a suitable hollow standard terminating at the top in a reduced cylindrical extension or spindle 2 offset from the lower portion and forming therewith an annular ledge or shoulder $s$. The spindle 2 terminates at the top in an inner flange 3 to which is bolted or otherwise secured the wheel-supporting ring or spider 4, formed with a series of radiating arms, two of which are provided with bosses 5 for the support of the screwbolts 6, said bolts passing between the spokes 7 of the vehicle wheel, the felly 8 of which carries the usual metal rim 9 as well understood in the art. The bolts 6 extend above the plane of the wheel and have passed over their upper portions a clamping bar 10 which is forced firmly against the hub H of the wheel by the nuts 11 preferably provided with operating handles 12 as shown. Two bolts located diametrically opposite one another are sufficient to hold the wheel to the spider or ring 4. The rim of the spider is formed with a suitable annular groove $h$ for receiving one of the rounded sides $b$ of the rim 9, this arrangement preventing any possible horizontal shifting of the wheel when once clamped to the ring (Figs. 1, 4).

Resting on the annular shoulder $s$ and freely revoluble about the spindle 2, and confined between said shoulder and the spider or ring 4, is the hub 13 of an upwardly bent sweep arm 14, the horizontal basal portion of the arm extending radially a suitable distance beyond the casing T of the tire to be set, and the vertical portion of the arm projecting a suitable distance above the horizontal plane of the wheel when resting on the ring 4. At the bend, the arm 14 is provided with a handle 15 as shown. Projecting horizontally, and radially inward from the free or upper end of the arm 14 is a housing 16 of substantially the cross-section shown in Fig. 2, the said housing being traversed in a horizontal direction by a slide or block 17 suitably guided on the housing (preferably by the tongue and groove $w$, $w'$, shown in Fig. 2), said block being actuated by a horizontal feed screw 18 mounted on the arm 14 and traversing the housing 16. The block 17 is in turn provided with vertical guide-ways or grooves formed by the plates 19, 19, for guiding the vertically reciprocable feed-block 20, from the lower end of which extends an arm 21 inclined sufficiently to bring its free end vertically below the feed screw 18 or vertically in line with the basal horizontal portion of the sweep arm 14. The free end of the arm 21 supports the spindle 22 of the bell-shaped tire-setting roller 23 the walls whereof flare toward the axis of the hub 13, the axis of rotation of the roller being inclined to the plane of its revolution or sweep around the rim 9, and the plane of rotation of the roller intersecting the plane of its revolution along a line inclined to the tangent to the arc or circle described in such revolution, as indicated respectively in Figs. 1 and 4, and in the diagrammatic view Fig. 5, it being understood that the roller 23 is caused to travel around the rim 9 by the rotary sweep of the arm 14 about the axis of the spindle 2. The block 20 is actuated by the vertical feed-screw 24 mounted on the block 17 as clearly indicated in the drawings. By the proper manipulation of the feed-screws 18 and 24 (each being provided with a hand-wheel W) the roller 23 may be adjusted to bring its edge $e$ into engagement with the groove $c$, formed between the bead $d$ and the outer walls of the main body of the tire casing as indicated in Fig. 4.

In the operation of the machine, the lower bead $d$ of the tire casing is first inserted behind the lower lip $n$ of the rim 9, thereby leaving the upper bead loose around the outside of the upper lip $n$ of the rim. Thereupon the operator manipulates the feed-screws 18 and 24 so as to bring the lower portion of the edge $e$ of the roller 23 into the groove $c$ between the bead $d$ and body of the casing T of the tire, the roller being fed downward sufficiently to force the outer edge of the bead $d$ below the edge of the upper lip $n$ (Fig. 4), the remaining portions of the bead being still on the outside of the lip and above the free edge thereof (Fig. 4). By now giving the arm 14 a single revolution about the axis of the spindle 2, the edge $e$ of the roller will traverse the groove $c$ through an arc of three-hundred and sixty (360) degrees, every portion of the bead successively engaged by the roller in its travel around the tire being forced under the edge of the upper lip $n$ (Fig. 4). As the roller leaves the portions thus successively depressed below the edge of the lip, these portions being no longer in contact with the roller will recover and automatically spring back behind the lip $n$ as shown by the dotted lines in Fig. 4, the entire bead $d$ springing into position behind the lip with a single revolution or sweep of the arm 14. The roller 23 it will be observed is bell-shaped, the outer walls being concave and the rotation axis of the roller being inclined to the plane of its revolution or sweep around the periphery of the tire. In this revolution the concave peripheral surfaces of the roller will depress the upper walls of the casing of the tire (assuming that the tire is of the pneumatic variety) as shown in Fig. 4, the upper bead $d$ being brought just below the edge of the upper lip $n$. It was pointed out above that the rotation plane of the roller 23 intersects its sweep plane along a line inclined to the tangent to the circle described in its sweep movement. This is due to the fact that the rotation axis of the roller is inclined not only to the plane of the roller's revolution (about the axis of the spindle 2), but to the radius of the circle described in such revolution. Thus, in Fig. 5, let R represent the radius of the arc or circle C described by the roller in its revolution about the axis of the spindle 2, and $r$ the rotation axis of the roller. The axis $r$ while inclined (vertically) to the (horizontal) plane of revolution of the roller (Figs. 1, 4,) is likewise inclined (horizontally) to the radius R. Assuming that $t$ (Fig. 5) represents the tangent to the circle C, then the line $m$ which represents the line of intersection of the planes of the roller's rotation and revolution, will make with the tangent $t$ an angle $a$, which is equal to the angle $a'$ between the lines R and $r$. To set the tire the sweep arm 14 must revolve counter-clockwise as indicated by the arrow in Fig. 5, or away from the vertex of the angle $a$. On the other hand, a tire once set may be released or forced from the rim by giving the arm 14 a sweep in the opposite direction (clockwise), the edge $e$ of the roller in such reverse sweep forcing the upper bead $d$ of the tire casing out from behind the upper lip $n$ of the rim. These setting and releasing actions of the roller are due to the two distinct inclinations of its rotation axis as previously described, whereby there is imparted to the roller a rotation in a plane intersecting the sweep plane along a line inclined to the tangent to the circle described in the sweep movement; and since this rotation plane makes an obtuse angle with the revolution plane (Figs. 1, 4,) on the side facing the axis of revolution, causing the edge $e$ of the roller to "nose" under the edge of the lip $n$, it is apparent from the drawings that this "nosing" with a sweep of the roller in one direction will tend to work the bead $d$ behind the lip $n$, and with a sweep in the opposite direction will tend to force it out from behind the lip. In the present embodiment of the invention the sweep arm 14 revolves about the tire and its supporting ring or spider which are stationary, but it would come within the spirit of my invention were the sweep arm and its roller stationary, and the wheel with its tire rotated, the result being the same, since the principle involved is the relative circular movement of the two members to one another, it being immaterial which one actually moves and which remains stationary. The machine is adapted for setting any compressible tire be the same pneumatic or solid, so long as it has side bead formations for passing behind the lips $n$ of the rim. It is obvious of course that the machine may be changed in detail without involving a departure from the nature or spirit of the invention. Features shown but not alluded to fall within the purview of the skilled mechanic and a description thereof is unnecessary in the present connection.

Having described my invention what I claim is:

1. In a tire-setting machine, a bell-shaped tire engaging roller, the outer surface of which is concave, and the inner surface of which is dished, means for causing said roller to traverse circularly the periphery of the tire, the axis of the roller being inclined to the plane of traverse, and its plane of rotation intersecting the plane of traverse along a line inclined to the tangent to the arc of the circular traverse of the roller.

2. In a tire-setting machine, a suitable support for a wheel rim and its tire, a sweep arm revolving about the axis of the rim while supported, a roller on the sweep arm rotating about an axis inclined to the sweep plane of the arm, and in a plane along a line disposed at an angle to the tangent to the circular arc of travel of the sweep arm, the under surface of said roller being dished to permit the roller to more closely approach the base of the rim for inserting the tire in the rim.

3. In a tire-setting machine, a suitable support for a wheel rim and its tire, a sweep arm revolving about the axis of the rim while supported, a roller on the sweep arm rotating about an axis inclined to the sweep plane of the arm, and in a plane along a line disposed at an angle to the tangent to the circular arc of travel of the sweep arm, the outer surface of said roller being concave, and the inner surface dished, said surfaces terminating in an annular edge for engaging the tire in positioning the latter in the rim.

In testimony whereof I affix my signature, in presence of two witnesses.

THOMAS KRAUSKA.

Witnesses:
 EMIL STAREK,
 JOS. A. MICHEL.